US010351040B2

(12) United States Patent
Fundin

(10) Patent No.: US 10,351,040 B2
(45) Date of Patent: Jul. 16, 2019

(54) TRAILER FOR TRANSPORTING A VEHICLE AND METHOD FOR PLACING A VEHICLE FOR TRANSPORT ON A TRAILER

(71) Applicant: NORTH GRADE AB, Åsele (SE)

(72) Inventor: Jörgen Fundin, Ängelholm (SE)

(73) Assignee: North Grade AB, Åsele (SE)

( * ) Notice: Subject to any disclaimer, the term of this patent is extended or adjusted under 35 U.S.C. 154(b) by 10 days.

(21) Appl. No.: 15/116,146

(22) PCT Filed: Feb. 5, 2015

(86) PCT No.: PCT/EP2015/052376
§ 371 (c)(1),
(2) Date: Aug. 2, 2016

(87) PCT Pub. No.: WO2015/118049
PCT Pub. Date: Aug. 13, 2015

(65) Prior Publication Data
US 2017/0182925 A1    Jun. 29, 2017

(30) Foreign Application Priority Data
Feb. 7, 2014   (EP) ...................................... 14154319

(51) Int. Cl.
*B60P 3/00*    (2006.01)
*B60P 3/10*    (2006.01)
(Continued)

(52) U.S. Cl.
CPC ................ *B60P 3/1033* (2013.01); *B60P 3/00* (2013.01); *B60P 3/10* (2013.01); *B60P 3/1066* (2013.01);
(Continued)

(58) Field of Classification Search
CPC ....... B60P 3/1033; B60P 3/105; B60P 3/1058; B60P 3/1066; B60P 3/1075; B60P 7/06;
(Continued)

(56) References Cited

U.S. PATENT DOCUMENTS 4,223,414 A *   9/1980   Dickson ................ B60P 3/1041
114/361
4,809,138 A     2/1989   Stovall
(Continued)

FOREIGN PATENT DOCUMENTS

AU              1095383 A    8/1983

*Primary Examiner* — Stephen T Gordon
(74) *Attorney, Agent, or Firm* — Capitol City TechLaw

(57) ABSTRACT

A trailer for transporting a vehicle may include a supporting structure adapted to carry the vehicle. A bracket structure including a tail light assembly may be attached to a section of the supporting structure. The tail light assembly may include tail lights for the trailer. The bracket structure may be movable between a first position in which the tail lights are positioned at the rear of the trailer in a driving position, and a second position in which the tail lights are positioned away from the rear of the trailer in a loading position. The bracket structure may be adapted to fixate the vehicle to the supporting structure when placed in the first position. A method may also be provided for placing a vehicle for transport on a trailer.

8 Claims, 4 Drawing Sheets

(51) Int. Cl.
*B60P 7/16* (2006.01)
*B60Q 1/30* (2006.01)
*B60Q 1/26* (2006.01)
*B60P 7/06* (2006.01)

(52) U.S. Cl.
CPC ............ *B60P 3/1075* (2013.01); *B60P 7/06* (2013.01); *B60P 7/16* (2013.01); *B60Q 1/2615* (2013.01); *B60Q 1/2657* (2013.01); *B60Q 1/305* (2013.01)

(58) Field of Classification Search
CPC ...... B60P 7/16; B60P 3/00; B60P 3/10; B60Q 1/2615; B60Q 1/305; B60Q 1/2657
USPC ............... 410/2–4, 7, 87, 88, 117, 120, 155; 362/485, 549; 280/414.1, 414.3; 414/462, 537, 538; 296/26.08, 26.09, 296/26.1, 26.11
See application file for complete search history.

(56) References Cited

U.S. PATENT DOCUMENTS

| | | | |
|---|---|---|---|
| 5,833,412 A * | 11/1998 | Valencia | B60P 3/062 410/2 |
| 6,367,866 B1 | 4/2002 | Moore | |
| 8,246,066 B1 | 8/2012 | Allen et al. | |
| 9,586,538 B2 * | 3/2017 | Fontayne | B60R 13/105 |
| 2010/0109284 A1* | 5/2010 | Brisson | B60P 3/1033 280/402 |
| 2014/0271017 A1* | 9/2014 | Watson | B60P 7/135 410/3 |

* cited by examiner

TRAILER FOR TRANSPORTING A VEHICLE AND METHOD FOR PLACING A VEHICLE FOR TRANSPORT ON A TRAILER

This application claims priority under 35 USC 119(a)-(d) to EP 14154319.9, which was filed on Feb. 7, 2014, the entire content of which is incorporated herein by reference.

TECHNICAL FIELD

The invention relates to a trailer for transporting a vehicle and a method for placing a vehicle for transport on a trailer.

BACKGROUND ART

Recreational vehicles, such as water vehicles, are usually transported from one location to another by use of a towed trailer on which the vehicle is mounted. Typically, these trailers are towed by an automobile having a towing rig mounted at the back end of the automobile.

Laws in many states require that vehicle lighting systems be mounted at the rear end of the trailer. These systems include tail lights, reversing lights, and stop lights.

Launching of a water vehicle mounted on such a trailer is usually accomplished in the following manner. A ramp is provided at the launch site. The ramp angles downward into the water, and the trailer may be backed down the ramp until the water vehicle is in a position with respect to the surface of the water at which the water vehicle, when means securing it to the towed trailer are removed, will be floatably supported on the surface of the water. A known trailer is shown in the patent document U.S. Pat. No. 4,809,138. A problem with conventional trailers is that a portion of the trailer is necessarily submerged during this launch procedure. Even if the sloping of the launching ramp is gradual, the lighting system of the trailer is likely to become submerged by the time the water vehicle is in a position to be released. Since the trailer is backed to this release position, the backing lights are on during the performance of the launching maneuver and there is a risk that the lighting system will short-circuit upon contact with the water. Additionally, direct exposure to the water can induce corrosion of the metal components of the lighting system. Corrosion will be particularly acute when the trailer is backed into a body of salt water. Moreover, the damage to and safety involved in the exposure of electrical wiring to water and more particularly to salt water, are obvious and significant.

SUMMARY OF THE INVENTION

It is an objective of the present invention to provide an improvement of the above technique and prior art. More particularly, it is an objective of this invention to provide an improved trailer for a safe and reliable transport of a vehicle.

According to a first aspect, these and other objects, and/or advantages that will be apparent from the following description of embodiments, are achieved, in full or at least in part, by a trailer for transporting a vehicle. The trailer comprises a supporting structure adapted to carry said vehicle, and a bracket structure comprising a tail light assembly attached to a section thereof, said tail light assembly comprising tail lights for said trailer. The trailer is characterized in that said bracket structure is movable between a first position in which said tail lights are positioned at the rear of the trailer in a driving position, and a second position in which said tail lights are positioned away from the rear of the trailer in a loading position. This is advantageous in that the tail light assembly will be properly arranged at the rear of the trailer when the bracket structure is placed in the first position such that the trailer may be transported from one place to another. When the bracket structure, however, is placed in the second position the tail light assembly will be positioned away from the rear of the trailer such that the vehicle on the trailer may be unloaded (or loaded if the trailer is empty). If the vehicle in question is a water based vehicle to be unloaded in water it is vital that the tail light is kept free from water when the back portion of the trailer is submerged into the water. This is an effect that will be achieved by means of the inventive design of the trailer according to the present invention.

The bracket structure may be adapted to fixate said vehicle to said supporting structure when placed in said first position. Thus, when the bracket structure is placed in the first position the vehicle loaded onto the trailer will automatically be fixated in relation to the same. The need for further fastening means, such as safety ropes or the like, is thereby eliminated. The trailer may further comprise a locking device for locking said bracket structure to said supporting structure when placed in said first position in order to increase the safety even further.

In one preferred embodiment of the invention the locking device may be attached to an end section of said supporting structure and adapted for locking engagement with said tail light assembly. By such a construction the components of the trailer will be kept to a minimum.

The bracket structure or the supporting structure may comprise a resilient portion exerting a pressure on said vehicle when said bracket structure is placed in said first position. The resilient portion will stabilize the vehicle during transport in relation to the both the bracket structure or the supporting structure. Potential damages on the vehicle may accordingly be avoided.

The tail light assembly may further comprise a license plate for said trailer, as well as lights in order to illuminate the license plate. Thus, also the license plate will be positioned away from the rear of the trailer when the bracket structure is placed in the second position. If the vehicle in question is a water based vehicle to be unloaded in water the risk of contaminating the license plate in the water will be eliminated.

According to a second aspect, these and other objects are achieved, in full or at least in part, by a method for placing a water vehicle for transport on a trailer, said trailer comprising a supporting structure adapted to carry said water vehicle, and a bracket structure comprising a tail light assembly attached to a section thereof, said tail light assembly comprising tail lights for said trailer. The method comprises the steps of placing said bracket structure in a second position in which said tail lights are positioned away from the rear of the trailer, loading said water vehicle on said supporting structure of said trailer, and placing said bracket structure in a first position in which said tail lights are positioned at the rear of the trailer.

According to a second aspect, these and other objects are achieved, in full or at least in part, by a trailer for transporting a vehicle. The trailer comprises a supporting structure adapted to carry said vehicle, and a bracket structure comprising a tail light assembly attached to a section thereof, said tail light assembly comprising tail lights for said trailer. The trailer is characterized in that said bracket structure is movable between a loading position in which said vehicle can be loaded onto said supporting structure, and a driving position in which said vehicle is fixated on said supporting structure.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other components, integers or steps.

By the term "loading position" of the trailer is meant a position of the trailer in which a vehicle may be loaded onto the trailer as well as be unloaded from the trailer.

The method disclosed above may be performed using any type of trailer and is accordingly not limited to the trailer described herein.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1:
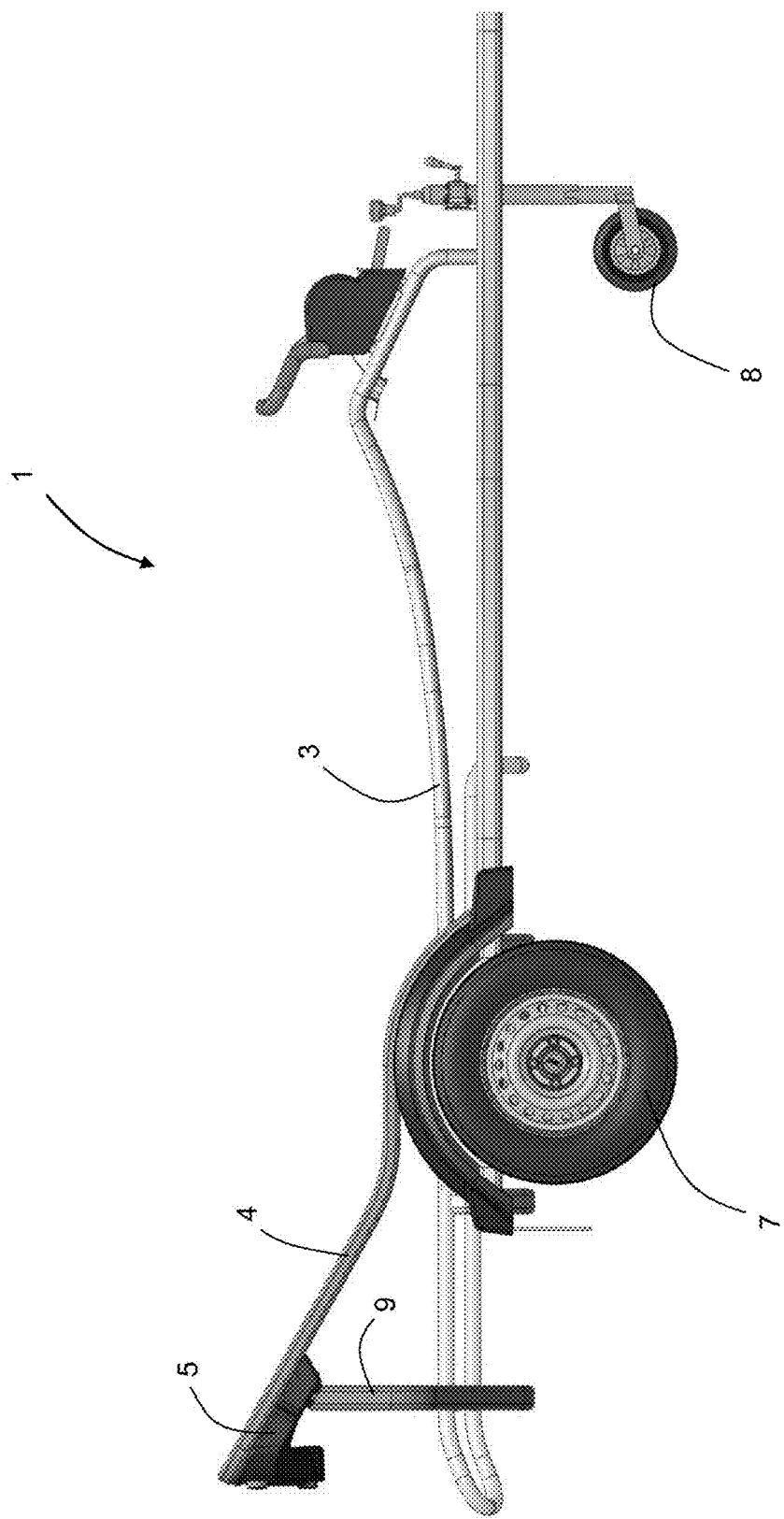
FIG. 1 is a side view of a trailer according to an exemplary embodiment of the present invention with a bracket structure being placed in a first position.

FIG. 1 illustrates a trailer 1 for transporting a water vehicle 2. The trailer 1 comprises a supporting structure 3 which is adapted to carry the water vehicle 2, and a bracket structure 4 which is used to fixate the water vehicle 2 to the trailer 1. The bracket structure 4 comprises a tail light assembly 5 which is attached to an end section thereof, and which comprises tail lights 6 and a license plate 10 for the trailer 1. The bracket structure 4 is movable between a first position (FIG. 1) in which the tail lights 6 are positioned at the rear of the trailer 1, in a driving position, and a second position (FIG. 2) in which the tail lights 6 are positioned away from the rear of the trailer 1, in a loading position. The trailer 1 has two rear wheels 7, one front wheel 8, and a connecting means (not shown) for connection to a driving vehicle (not shown). However, the trailer 1 could have any suitable number of rear wheels 7, e.g. four such wheels. The trailer 1 further comprises a locking device 9 attached to the end section of the supporting structure 3 and adapted for locking engagement with the tail light assembly 5 in a snap-lock manner. This way, the bracket structure 4 will be locked in relation to the supporting structure 3 when placed in the first position, thereby placing the trailer 1 in the driving position.

Figure 2:
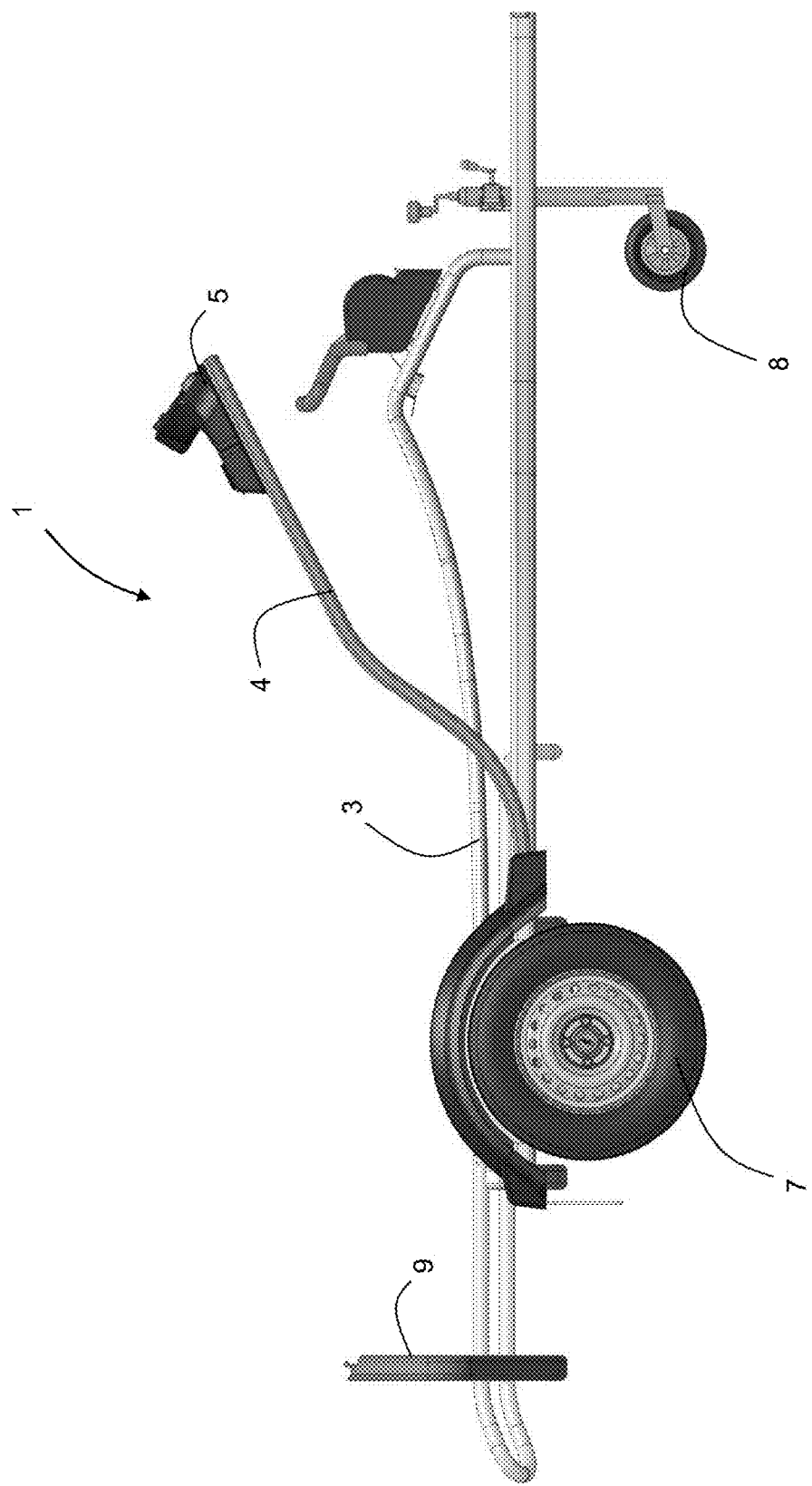
FIG. 2 is a side view of the trailer with the bracket structure being placed in a second position.

In FIG. 2, the trailer 1 is illustrated when the bracket structure 4 is placed in the second position, which in turn means that the trailer 1 is placed in the loading position.

Figure 3:
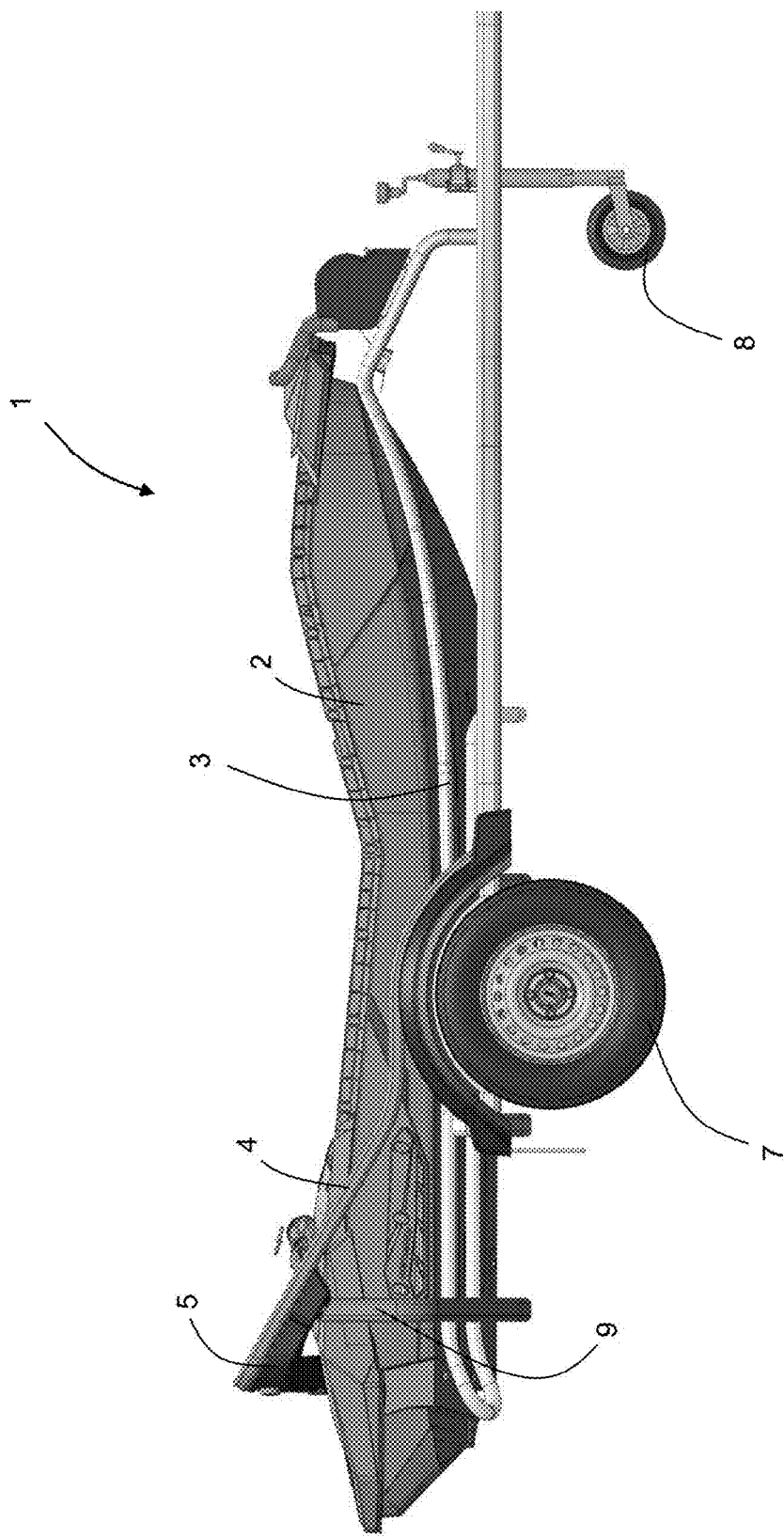
FIG. 3 is a side view of the trailer carrying a vehicle and the bracket structure being placed in a first position.

FIG. 3 illustrates the trailer 1 carrying a water vehicle 2. The bracket structure 4 has been placed in the first position thereby fixating the water vehicle 2 to the trailer 1 and placing the same in the driving position.

Figure 4:
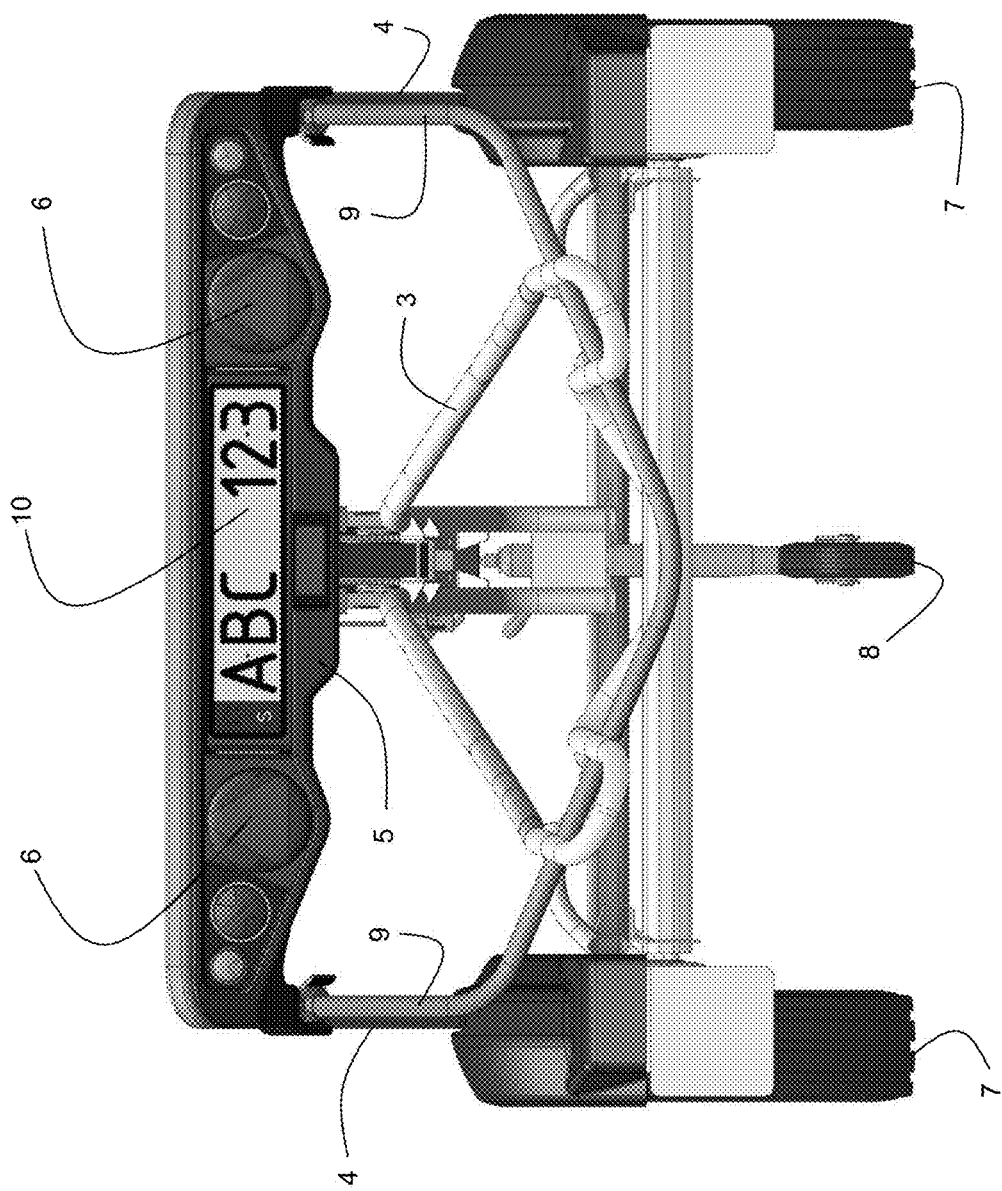
FIG. 4 is a rear view of the trailer.

In FIG. 4, the trailer 1 is illustrated viewed from the rear. The tail light assembly 5, the tail lights 6 and the license plate 10 of the trailer 1 is shown when the bracket structure 4 is placed in the first position.

The exemplary embodiment of the trailer 1, which is described above, functions according to the following. When a water vehicle 2 is to be transported using the trailer 1 the bracket structure 4 is placed in the second position. The trailer 1 is thereby placed in a loading position in which the tail light assembly 5 is positioned away from the rear of the trailer 1. The water vehicle 2 can now be loaded onto the trailer 1. When the water vehicle has been placed on the supporting structure 3 of the trailer 1 the bracket structure 4 is placed in the first position. The bracket structure 4 is fixated to the locking device 9 in a snap-lock manner and is accordingly locked in relation to the supporting structure 3, thereby placing the trailer 1 in the driving position with the tail light assembly 5 positioned at the rear of the trailer 1. When the water vehicle 2 is to be unloaded in to water the bracket structure 4 is again placed in the second position such that the tail light assembly 5 is positioned away from the rear of the trailer 1. The trailer 1 can now be backed down a ramp until the water vehicle 2 is in a position with respect to the surface of the water, at which the water vehicle 2 can be unloaded, without risking that the tail light assembly 5 will come into contact with the water.

The skilled person realizes that a number of modifications of the embodiments described herein are possible without departing from the scope of the invention, which is defined in the appended claims.

For instance, the bracket structure may comprise a resilient portion exerting a pressure on the vehicle when the bracket structure 4 is placed in the first position.

Naturally, the trailer may be used for transport of any suitable vehicle. That is to say, both water vehicles and land vehicles can be transported on the trailer.

The tail light assembly may include any combination of tail lights, stop lights, fog lights, reversing lights, and direction indicator lights.

The trailer may be of any suitable sort and comprise any suitable combination of components. For example, the placing and amount of wheels may be varied.

The invention claimed is:

1. A trailer for transporting a vehicle, the trailer comprising:
   a supporting structure adapted to carry the vehicle; and
   a bracket structure supporting a tail light assembly, the tail light assembly including tail lights for the trailer;
   wherein the bracket structure is mounted for movement relative to the supporting structure between a first position in which the tail lights are positioned at a rear of the trailer in a driving position, and a second position in which the tail lights are positioned away from the rear of the trailer in a loading position; and
   wherein the bracket structure is adapted to fixate the vehicle to the supporting structure when placed in the first position.

2. The trailer according to claim 1, further comprising a locking device for locking the bracket structure to the supporting structure when placed in the first position.

3. The trailer according to claim 2, wherein the locking device is attached to an end section of the supporting structure.

4. The trailer according to claim 2, wherein the locking device is adapted for locking engagement with the tail light assembly.

5. The trailer according to claim 1, wherein the bracket structure includes a resilient portion exerting a pressure on the vehicle when the bracket structure is placed in the first position.

6. The trailer according to claim 1, wherein the tail light assembly includes a license plate for the trailer.

7. A method for placing a vehicle for transport on a trailer, the trailer having a supporting structure adapted to carry the vehicle, and a bracket structure supporting a tail light assembly that includes tail lights for the trailer, the method comprising:
    placing the bracket structure in a second position in which the tail lights are positioned away from a rear of the trailer;
    loading the vehicle on the supporting structure of the trailer; and
    placing the bracket structure in a first position in which the tail lights are positioned at the rear of the trailer, such that the bracket structure fixates the vehicle to the supporting structure.

8. The trailer according to claim 1, wherein the tail light assembly is positioned on the bracket structure such that, when the bracket structure is placed in the first position, the vehicle is captured between the tail light assembly and the supporting structure.

* * * * *